US010089210B2

(12) United States Patent
McCollum et al.

(10) Patent No.: US 10,089,210 B2
(45) Date of Patent: *Oct. 2, 2018

(54) AUTO-GENERATION OF PROVIDER FUNCTIONALITY

(75) Inventors: Raymond W. McCollum, Redmond, WA (US); Daniel Pravat, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1700 days.

This patent is subject to a terminal disclaimer.

(21) Appl. No.: 11/693,369

(22) Filed: Mar. 29, 2007

(65) Prior Publication Data

US 2008/0244528 A1 Oct. 2, 2008

(51) Int. Cl.
*G06F 7/00* (2006.01)
*G06F 11/36* (2006.01)
G06F 8/30 (2018.01)
G06F 17/21 (2006.01)

(52) U.S. Cl.
CPC ............ *G06F 11/3624* (2013.01); *G06F 8/30* (2013.01); *G06F 17/218* (2013.01)

(58) Field of Classification Search
CPC .............................. G06F 8/30; G06F 18/30011
USPC ................... 707/104.1, 100, 7, 10, 693, 694
See application file for complete search history.

(56) References Cited

U.S. PATENT DOCUMENTS

| 5,546,577 | A | * | 8/1996 | Marlin .............. G06F 17/30607 |
| 5,835,712 | A | * | 11/1998 | DuFresne .................... 709/203 |
| 6,311,327 | B1 | | 10/2001 | O'Brien et al. |
| 6,611,924 | B1 | * | 8/2003 | Warmink ............ G06F 11/3624 |
| | | | | 714/38.12 |
| 6,654,953 | B1 | | 11/2003 | Beaumont et al. |
| 6,874,140 | B1 | * | 3/2005 | Shupak ............... G06F 11/3644 |
| | | | | 714/E11.209 |
| 6,910,183 | B2 | | 6/2005 | Maier et al. |
| 6,978,272 | B1 | * | 12/2005 | Ellmann et al. .............. 707/102 |
| 7,000,218 | B2 | | 2/2006 | Gerken |
| 7,017,162 | B2 | | 3/2006 | Smith et al. |
| 7,181,732 | B2 | * | 2/2007 | Bak et al. ...................... 717/140 |
| 7,188,072 | B2 | * | 3/2007 | Eichstaedt ............. G05B 15/02 |
| | | | | 705/7.11 |
| 7,565,645 | B2 | * | 7/2009 | Barrs et al. .................... 717/130 |
| 8,719,768 | B2 | * | 5/2014 | Hass ......................... G06F 8/10 |
| | | | | 707/722 |

(Continued)

FOREIGN PATENT DOCUMENTS

WO    WO2005048066 A2    5/2005

OTHER PUBLICATIONS

Jayaputera, et al., "Runtime Verification of Timing and Probabilistic Properties using WMI and .NET", available at least as early as <<Jan. 11, 2007>> at <<http://www.idt.mdh.se/ecbse/2004/presentations/poernomo2004.pdf>>, pp. 22.

(Continued)

*Primary Examiner* — Eliyah S Harper
(74) *Attorney, Agent, or Firm* — Workman Nydegger

(57) ABSTRACT

Described are systems and methods for implementing auto-generation of provider functionality. An approach is discussed regarding exposing a management surface of an application by using a system of informational tagging on existing code in the application. The informational tagging can include a set of classification techniques using attribution.

20 Claims, 6 Drawing Sheets

(56) References Cited

U.S. PATENT DOCUMENTS

| | | | |
|---|---|---|---|
| 2002/0016725 A1* | 2/2002 | Eichstaedt | G05B 15/02 |
| | | | 705/7.29 |
| 2002/0156792 A1* | 10/2002 | Gombocz | G06F 17/30286 |
| 2003/0187821 A1* | 10/2003 | Cotton | G06Q 10/10 |
| 2003/0208481 A1* | 11/2003 | Neumann | G06F 11/3428 |
| 2004/0002943 A1* | 1/2004 | Merrill | H04L 41/0893 |
| 2004/0039745 A1* | 2/2004 | Evans | G06F 17/30607 |
| 2004/0088713 A1* | 5/2004 | Myllymaki et al. | 719/315 |
| 2005/0010933 A1* | 1/2005 | Vaught | 719/328 |
| 2005/0158837 A1* | 7/2005 | Bond | C12N 9/54 |
| | | | 435/182 |
| 2006/0101038 A1* | 5/2006 | Gabriel | G06F 8/71 |
| 2006/0206507 A1* | 9/2006 | Dahbour | G06F 17/30604 |
| 2006/0236222 A1 | 10/2006 | Marmigere et al. | |
| 2006/0253490 A1 | 11/2006 | Krishna et al. | |
| 2007/0156694 A1* | 7/2007 | Lim | G06F 21/6218 |

OTHER PUBLICATIONS

"The .NET Framework", available at least as early as <<Jan. 11, 2007>> at <<http://media.wiley.com/product_data/excerpt/98/07645482/0764548298.pdf>>, pp. 18.

* cited by examiner

AUTO-GENERATION OF PROVIDER FUNCTIONALITY

BACKGROUND

Management systems are typically used to monitor functioning of various applications in a network and to provide diagnostic services when an application does not operate properly In extreme cases, the application may have to be reset to factory defaults and restarted in order to properly recover from a failure; however, in certain cases, various applications may have to be provided with appropriate instrumentation to make them compatible with the management systems. In this context, instrumentation refers to additional code which is not part of that application's primary function, but is a part of management and maintenance surface.

Most applications expose secondary functionality of enabling diagnostic and monitoring techniques in an inconsistent manner. This may be because the secondary functionality requires the applications to interface with well-known management systems. Since the management systems can vary from vendor to vendor and product to product, application developers typically do not know which interfaces to implement when producing new software.

In many situations, application developers write a separate code called a "provider" for every application that interfaces with management systems to enable the applications to work with the management systems through an instrumentation application. A downside is that the technologies which enable an application to work application to work with a management system are rather complex and the need to provide an arbitrary interface makes the task of coding (i.e., providing for) a "provider" more complicated.

SUMMARY

This summary is provided to introduce simplified concepts of auto-generation of provider functionality, which is further described below in the Detailed Description. This summary is not intended to identify essential features of the claimed subject matter, nor is it intended for use in determining the scope of the claimed subject matter.

In an embodiment, management tags are embedded in an application, and management indicator tags are inserted in class allowing the class to denote management functionality. The values of the tags then may be identified in the application.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for implementing auto-generation of provider functionality. More particularly, the disclosure describes an approach to exposing a management surface of an application by using a system of informational tagging on existing code in the application. The informational tagging includes a set of classification techniques using attribution. In one implementation, .Common Language Runtime or CLR (e.g. .NET attribution) is used on code written in C#, J#, Visual Basic .NET or any other .NET-enabled language to expose the management surface.

While developing an application, a developer can use the attribution system in the form of management tags to indicate which existing code segments in the application can provide information to a management system. These management tags can be identified by a management tags decoder in a management instrumentation application. The management instrumentation application can then obtain management related information from the indicated code segments and send the information to a management system. The management system uses the information for monitoring and diagnostic purposes.

While aspects of described systems and methods for auto-generation of provider functionality can be implemented in any number of different computing systems, environments, and/or configurations, embodiments are described in the context of the following exemplary system architectures.

Exemplar System

Figure 1:
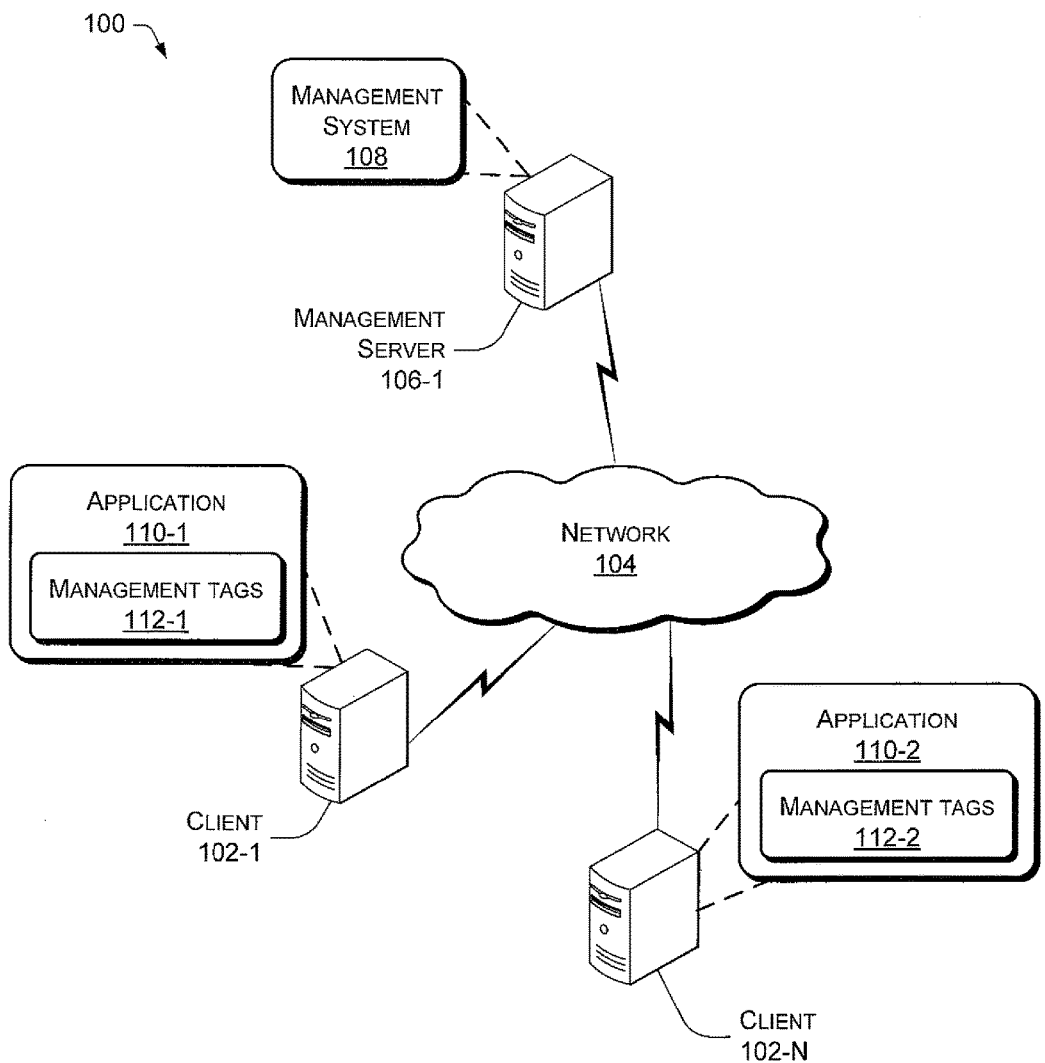
FIG. 1 is an illustration of an exemplary system for implementing auto-generation of provider functionality.

FIG. 1 illustrates an exemplary system 100 for implementing auto-generation of provider functionality. The system 100 includes client computing devices 102-1, 102-2 . . . 102-N, collectively called client 102, associated through a network 104 with a management server 106. The client 102 may be any of a variety of conventional computing devices, including, for example, a server, a desktop PC, a notebook or portable computer, a workstation, a mainframe computer, a mobile computing device, an Internet appliance, a kiosk, etc.

The network 104 may be a wireless or a wired network, or a combination thereof. The network 104 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs).

The management server 106 may be any of a variety of servers that use one or more management applications, such as management system 108, to monitor the functioning of hardware and software installed in the clients 102. For example, the management system 108 can monitor one or more applications, such as application 110 on the client 102. In one implementation, the management server 106 may be a Microsoft® Operations Manager or MOM server that uses a MOM management system to monitor applications executing on the client 102.

The application 110 can be any of a variety of applications executing on the client 102, such as an operating system, an e-mail application, a system process, etc. The application 110 includes management tags (referred to as tags) 112 embedded within its code to indicate which code segments can provide information to the management system 108. For example, the information provided to the management system 108 may include a list of services running, users logged on, applications running, hardware installed, status of hardware, etc.

The management tags 112 may be based on an attribution system such such as .NET attribution and embedded in the application 110 in a non-executable manner so that the management tags 112 remain in the object code after the application 110 is compiled. The management tags 112 may not be dedicated to any particular code or application. Rather, the management tags 112 can be selected from a set of pre-defined attributes to expose any tagged code to a management system 108. The management tags 112 may be of several types, such as indicator tags, configuration tags, task tags etc., and based on the type of information that the respective code segments provide.

By way of example, consider the following code segment of an application with various embedded management tags 112. It is to be understood that though the following code segment is based on a .NET framework, the code segment is intended to be exemplary, and therefore representative of any programming language that can be used to create an application with embedded tags.

```
ManagementEntity]
class MyService
{
    [ManagementConfiguration]
    public int SettingA;
    public int SettingB;
    [ManagementTask]
    static public void Restart( ){ }
    [ManagementProbe]
    public int CurrentLoggedOnUsers { get; }
}
```

In the example code segment shown above, a management indicator tag tag [ManagementEntity] is used with a class definition to indicate that the class has been developed with embedded management tags 112 and is capable of providing management related information. A property or a field in the class definition related to configuration can be tagged with a [ManagementConfiguration] attribute. In the example above, SettingA is tagged as a ManagementConfiguration item, whereas SettingB is not. Therefore, SettingA will be published or made available to the management system 108, while SettingB will not be published.

In a similar manner, a method intended to be a user-facing task can be tagged with [ManagementTask]. In the example above, the [ManagementTask] tag indicates that an end-user can have some technique via a management tool to "Restart" the application. Other functions and methods without the [ManagementTask] attribute can be treated as internal to the application but are not published to the management system 108.

In addition, some value(s) in the application may be intended for the management system 108 to monitor the application and can be published explicitly using a [ManagementProbe] tag as shown above. The [ManagementProbe] tag indicates that the value(s) are suitable for probing to determine a status of the application or to assist in diagnostics. In cases where there is a collection of related probes rather than a simple value, an [ManagementEnumerator] tag, along with a [ManagementBind] tag can be used. For example, to get the names of the logged on logged on users, the following code segment can be used in an application:

```
[ManagementEntity]
class MyService
{
    [ManagementBind]
    MyService(string p1, int p2) { }
    [ManagementEnumerator]
    public IEnumerable<string> GetLoggedOnUsers( ) { }
}
```

Similarly, a number of additional supporting attribute values can also be used as tags to publish various other management related information. The management tags 112 can be chosen from an attribute value space that can be pre-defined.

In operation, when the application 110 is compiled during processing, the compiled code or object code is automatically scanned for the management tags 112. The management related information is then obtained from the code segments associated with the management tags 112 and is published to the management system 108 at runtime. This is explained in detail below with reference to FIG. 2.

Exempla Client Computing Device

Figure 2:
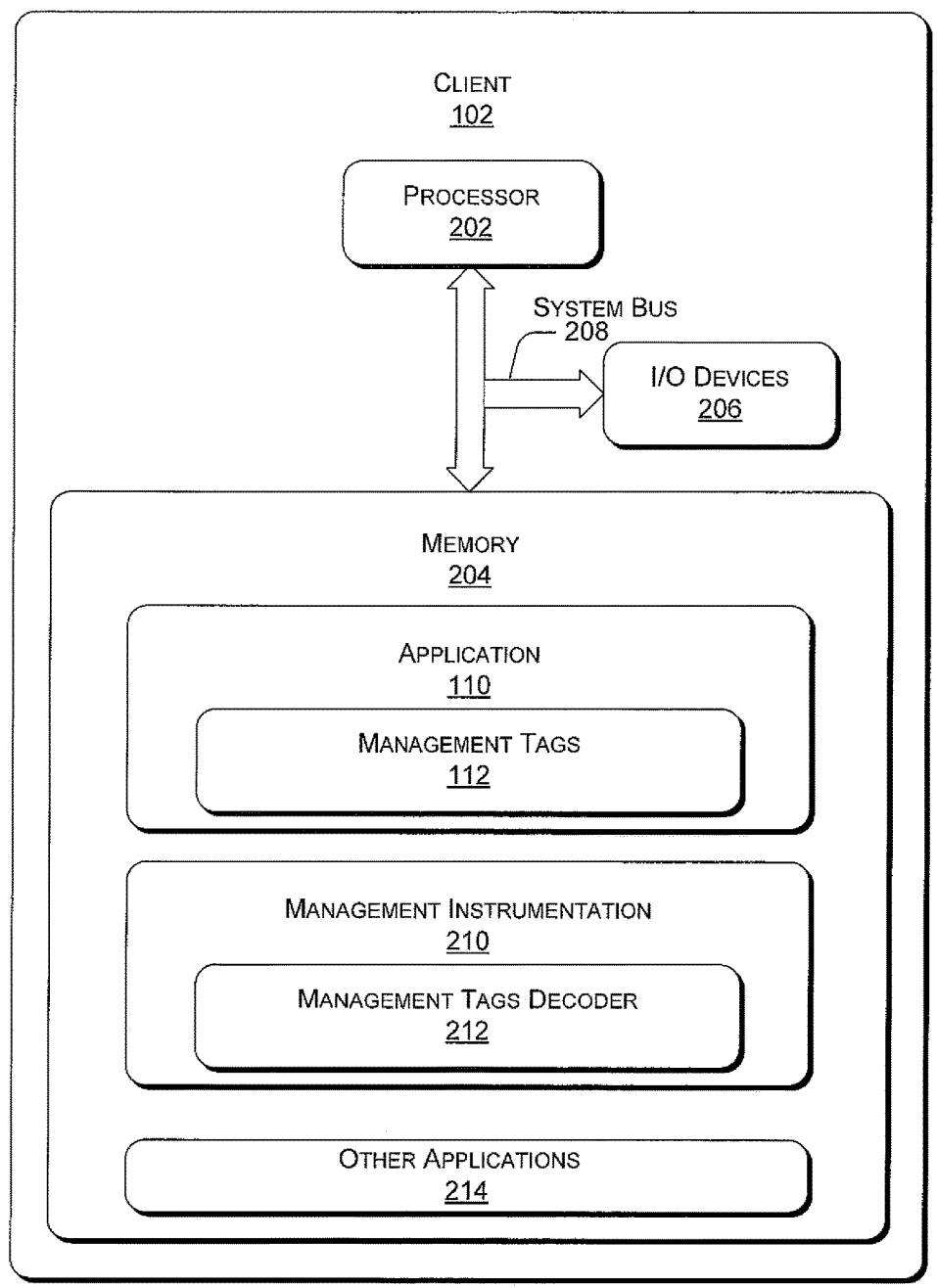
FIG. 2 is an exemplary implementation of a client computing device.

FIG. 2 illustrates an exemplary client 102. Exemplary working of the client 102 to implement auto-generation of provider functionality is described in detail with reference to FIG. 1. The client 102 can include a processor 202, a memory 204, input/output (I/O) devices 206 (e.g., keyboard, display, and mouse), and a system bus and a system bus 208 operatively coupling various components of the remote client 102.

System bus 208 represents any of several types of bus structures, including a memory bus or memory controller, a peripheral bus, an accelerated graphics port, and a processor or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, or an IEEE 1294 (i.e., FireWire) bus.

Memory 204 can include computer-readable media in the form of volatile memory, such as RAM and/or non-volatile memory, such as ROM, or flash RAM. Memory 204 typically includes data and/or program modules for implementing auto-generation of provider functionality, which are immediately accessible to and/or presently operated on by processor 202. In one embodiment, memory 204 includes an application 110, a management instrumentation application (referred to as management instrumentation) 210 and other applications 212.

The management instrumentation 210 can be any implementation of a Common Information Model or CIM that allows management related information to be shared between the applications on the client 102, such as application 110, and the management system 108. For example, the management instrumentation 210 can be an implementation of the Windows® Management Instrumentation (WMI).

The management instrumentation 210 obtains the information from the application 110 and maintains the information in a format which is readily accessible by the management system 108. For example, the management instrumentation 210 may maintain the information in a database arranged in a tabular format according to the type of information. The management system 108 can access any type of information by referring to one or more columns in the tabular format.

In legacy or earlier systems, a code dedicated to each application called a "provider" may be required to interface between the application and the management instrumentation 210. In the present system, the application 110 includes the management tags 112 embedded in application code to indicate which code segments can provide management related information to the management instrumentation 210.

The management instrumentation 210 may further include a management tags decoder 214 configured to identify the management tags 112 and obtain the information directly from the code segments associated with the management tags 112. Thus, the provider functionality can be generated automatically using the management tags 112 and the management tags decoder 214.

In operation, once the application 110 is compiled, an object code that includes the management tags 112 is generated. The management instrumentation 210 accesses the object code and determines whether the object code includes the management tags 112 using the management tags decoder 214. When the management tags 112 are found, the management instrumentation 210 invokes and executes the application 110 to obtain the information from the code segments associated with the management tags 112. The management instrumentation 210 then stores the information in a manner so that the information is accessible to the management system 108.

It will be understood that the management instrumentation 210 can obtain and store information from multiple applications, each of which include embedded tags, in a manner similar to that described above.

Exemplary Data Flow and Methods

Figure 3:
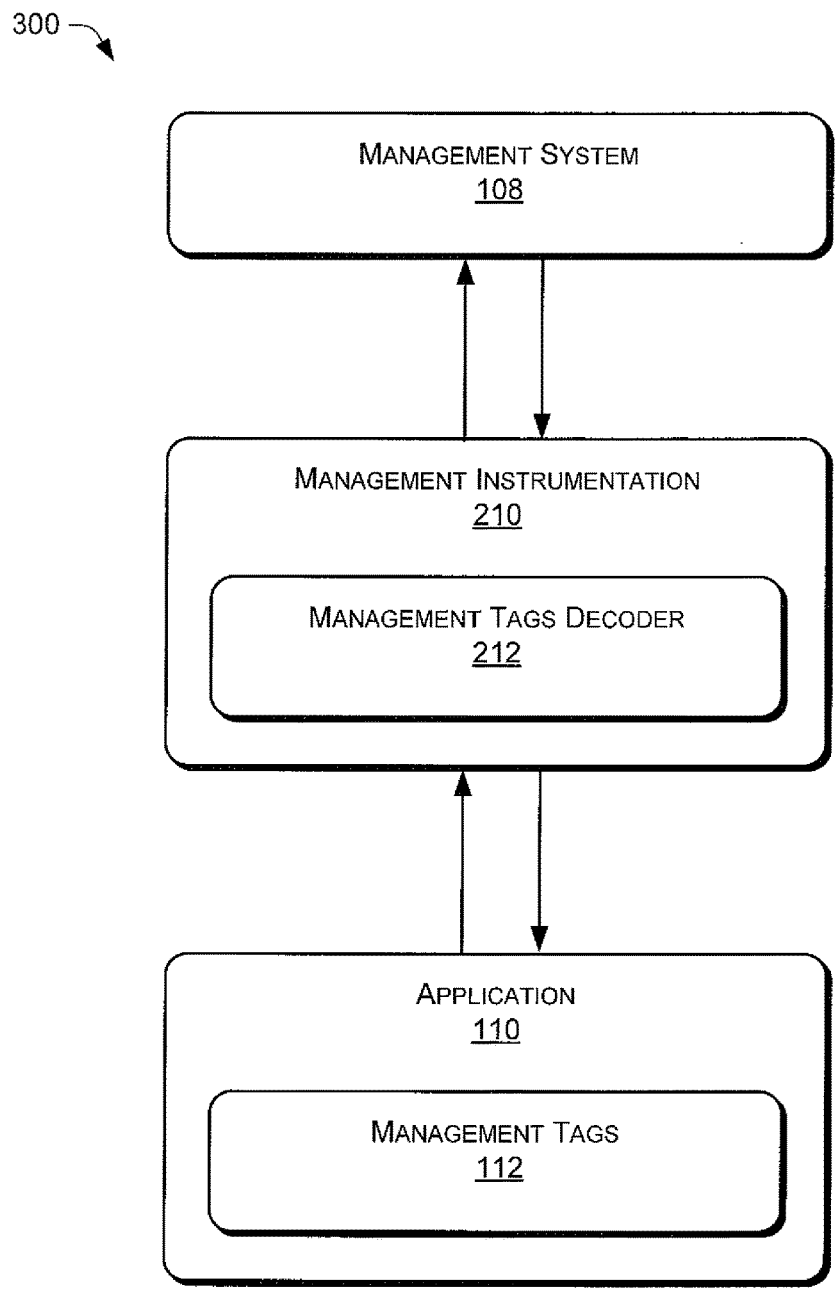
FIG. 3 is an illustration of exemplary data flow between a client computing device and a management system.

FIG. 3 illustrates exemplary data flow 300 between the management system 108, the management instrumentation 210 and various applications that execute on client 102, such as application 110. For discussion purposes, the data flow 300 is described with reference to the system 100 shown in FIG. 1 and the client 102 client 102 shown in FIG. 2.

When application 110 that includes management tags 112 is compiled on a client 102, an object code including the management tags 112 is generated. The management instrumentation 210 uses management tags decoder 214 to access the object code and determine whether the object code includes any management tags 112. The management tags decoder 214 is thus employed to expose the management surface of the application 110. In case the management tags 112 are found, the management instrumentation 210 invokes and executes the application 110 to obtain management related information from the code segments associated with the management tags 112. The management instrumentation 210 then stores the information in a manner so that the information is accessible to the management system 108.

Thus the management instrumentation 210 interfaces between the management system 108 and the application 110. The management system 108 communicates with the management instrumentation 210 to retrieve information for monitoring the application 110 and providing diagnostic services.

The management system 108 can also send instructions related to diagnostic measures to the management instrumentation 210. The management instrumentation 210 can then transfer the instructions to the application 110 using the management tags decoder 214. For example, the management system 108 can send instructions for resetting the application 110 when the application 110 is found to have failed. This technique eliminates the need for dedicated interfaces between the application 110 and the management instrumentation 210 and is thus not specific to any application management technology.

Figure 4:
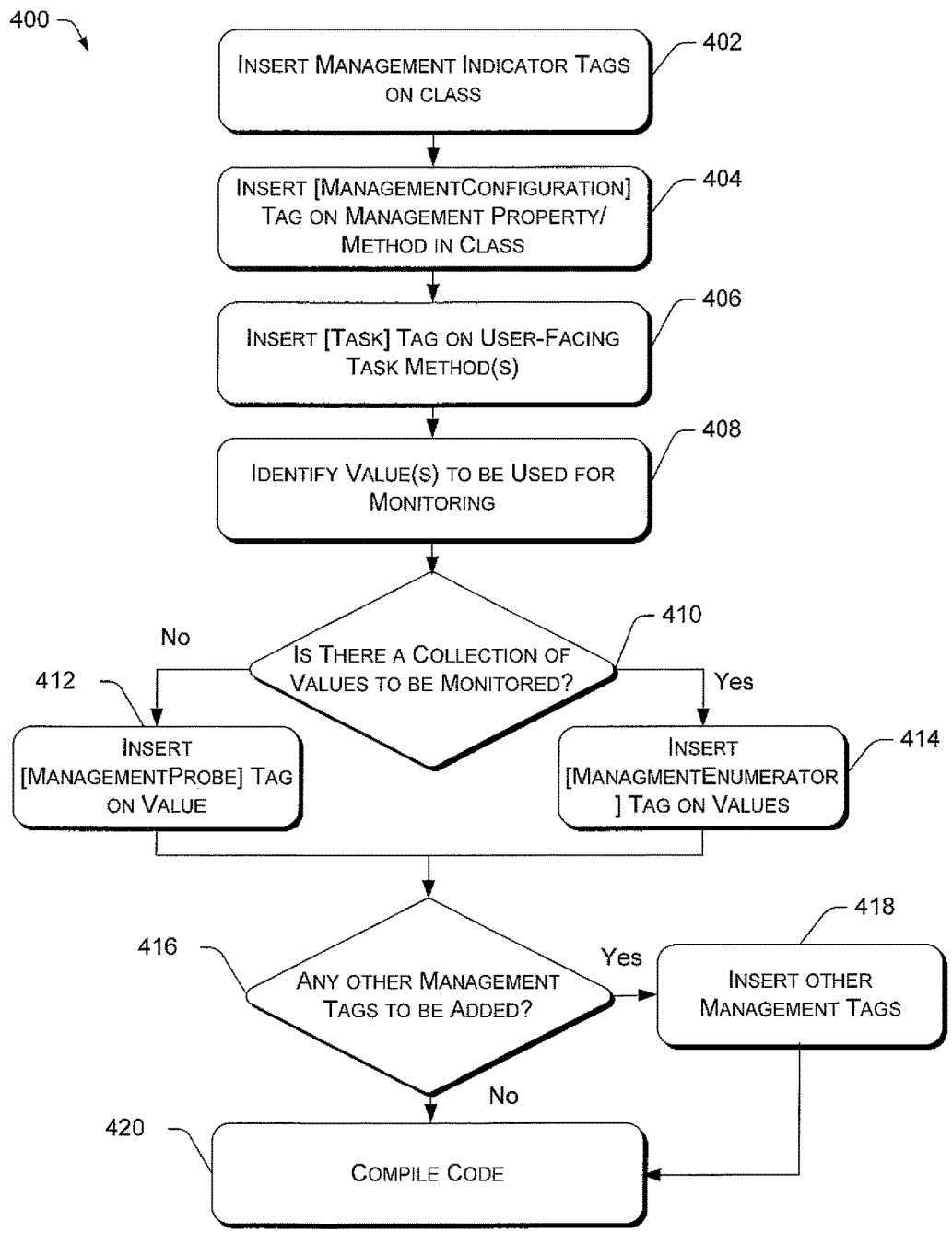
FIG. 4 is an exemplary method of embedding management tags in an application.

FIG. 4 illustrates an exemplary method 400 of embedding management tags in an application. Process 400 is illustrated as a collection of blocks in a logical flow graph representing a sequence of operations that can be implemented in hardware, software, firmware or a combination thereof. In a particular implementation process 400 may be performed by a developer or user. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

In the context of software, the blocks represent computer instructions that, when executed by one or more processors, perform the recited operations. For discussion purposes, the process 400 is described with reference to the system 100 shown in FIG. 1 and the client 102 shown in FIG. 2.

At block 402, management indicator tags are inserted in a class. The management indicator tags denote that the class has management functionality. The management indicator tags may be one of the different types of management indicator tags, such as, for example, [ManagementEntity] tag, [ManagementBind] tag, tag, [ManagementCreate] tag, [ManagementEntity] tag, etc. The [ManagementEntity] tag acts as an indicator to signify that a class includes management functionalities. The [ManagementBind] tag marks methods that can be called by a management system 108 shown in FIG. 3. The [ManagementCreate] tag marks methods that can be called when a new object is created in the management space.

At block 404, [ManagementConfiguration] tags are inserted on a field or a property in the class definition that is related to configuration. Further at block 406, [ManagementTask] tags are inserted on user-facing task methods. The [ManagementTask] tags indicate that an end-user can be provided with techniques (i.e., user performance attributes) to perform the user-facing tasks, such as restarting an application.

At block 408, values in the code that are to be used for monitoring the application are identified. At block 410, it is determined whether a collection of values are to be monitored by the management system. If a single value is to be monitored, (i.e., following the "no" branch from 410), a [ManagementProbe] tag is attached to the value at block 412. If a collection of values are to be monitored (i.e., following the "yes" branch from 410), an [ManagementEnumerator] tag is inserted with the values at block 414.

At block 416, it is determined whether any other management tags need to be added. If a positive determination is made, (i.e., following the "yes" branch from 416), the other management tags are added. If a negative determination is made, (i.e., following the "no" branch from 416), the application development stage is completed and the application can be compiled at block 420. It will be understood that the block 418 repeats its operation of placing other necessary management tags until all the required tags have been attached to appropriate sections of the application.

By way of example, the following code segment of an application with various embedded management tags 112 that can be created by a process such as process 400 described above. It is to be understood that although the following code segment is based on a .NET framework, the code segment is intended to be exemplary and, therefore, representative of any programming language that can be used to create an application with embedded tags.

```
[ManagementEntity]
public class UMPSample
{
  [ManagementBind]
  public static UMPSample BindToInstance(char Key)
  {
    return (UMPSample)m_htInstances[(Int32)(Int16)(char)Key];
  }
  [ManagementCreate]
  public static UMPSample CreateInstance(string guid)
  {
    UMPSample Instance =
    new UMPSample((UInt16)(UInt32)m_CrtInstanceId);
    Instance.GUID = guid;
    m_htInstances[m_CrtInstanceId] = Instance;
    m_CrtInstanceId++;
    return Instance;
  }
  //instrumentation
  [ManagementKey]
  public readonly char key;
  [ManagementConfiguration]
  public DateTime Today = DateTime.Now;
  [ManagementConfiguration]
  public char ACharacter = ' ';
  [ManagementProbe]
  public TimeSpan HowLong
  {
      get {
          return DateTime.Now - Today;
      }
  }
  [ManagementConfiguration]
  public string GUID
  {
      get
      {
        return m_guid;
      }
      set
      {
        m_guid = value;
      }
  }
  [ManagementProbe]
  public string Comment
  {
      get { return "This is RO property"; }
  }
  [ManagementProbe]
  public readonly int LifeAnswer = 42;
  [ManagementTask]
  static public void Demo( )
  { Console.WriteLine("SampleBase::Demo( )"); }
  [ManagementTask]
  public void DynamicDemo(int value)
  {
    Console.WriteLine("SampleBase::DynamicDemo( ) called by
    WMI");
    Console.WriteLine("key = " + key);
    Console.WriteLine("GUID = " + m_guid);
    Console.WriteLine("value = " + value);
  }
  [ManagementTask]
  public int DynamicDemo3(int value1, ref string value2, out int Others)
  {
    Console.WriteLine("SampleBase::DynamicDemo3( ) called by
    WMI");
    Console.WriteLine("key = " + key);
    Console.WriteLine("GUID = " + m_guid);
    Console.WriteLine("value1 = " + value1);
    Console.WriteLine("value2 = " + value2);
    Others = 42;
    value2 = value2 + " : " + value1;
    return Process.GetCurrentProcess( ).Id;
  }
```

-continued

```
  [ManagementTask]
  public void TestTaskCallTypes(ref Byte outValue)
  {
    outValue = (Byte)(Byte.MaxValue - outValue);
  }
  [ManagementEnumerator]
  static public IEnumerable EnumerateInstances( )
  {
    foreach (DictionaryEntry de in m_htInstances)
    {
      yield return de.Value;
    }
  }
}
```

Figure 5:
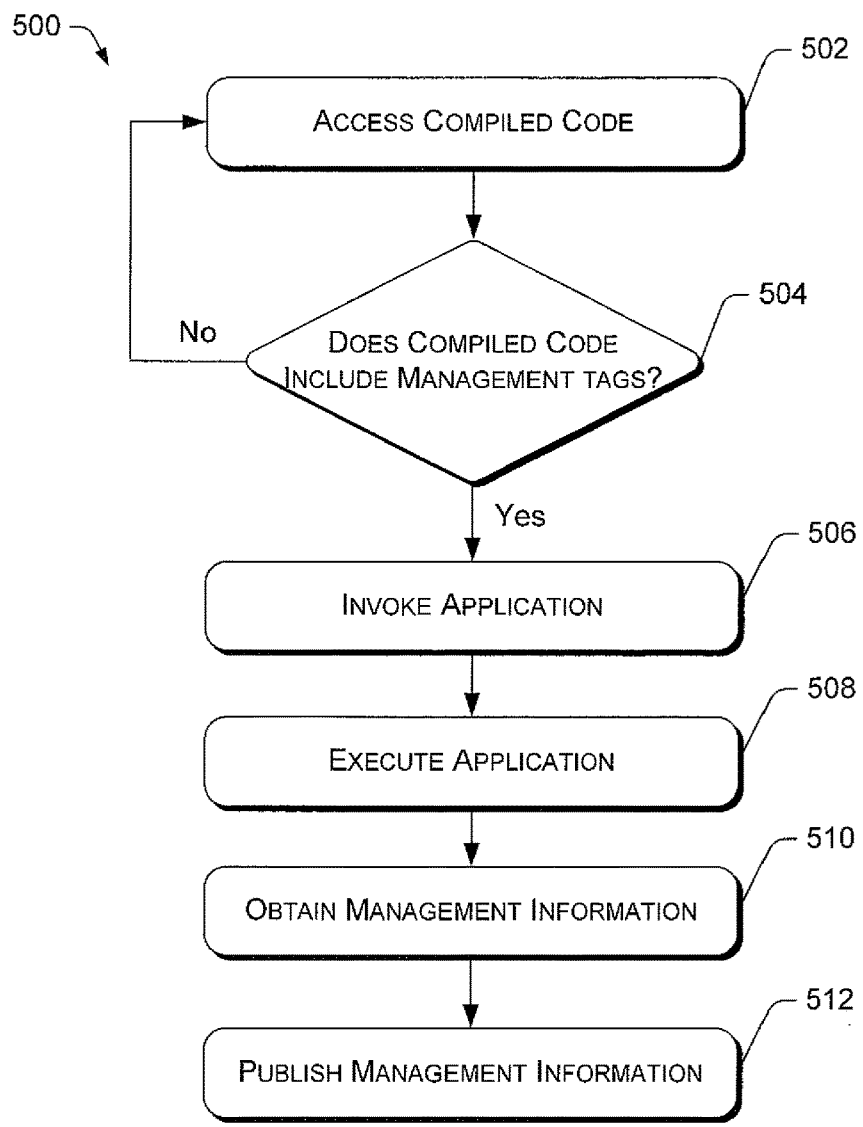
FIG. 5 is an exemplary method of identifying and publishing management information.

FIG. 5 illustrates an exemplary method 500 of identifying and publishing management information. Process 500 is illustrated as a collection of blocks in a logical flow graph representing a sequence of operations that can be implemented in hardware, software, firmware or a combination thereof. The order in which the method is described is not intended to be construed as a limitation, and any number of and any number of the described method blocks can be combined in any order to implement the method, or an alternate method. Additionally, individual blocks may be deleted from the method without departing from the spirit and scope of the subject matter described herein.

In the context of software, the blocks represent computer instructions that, when executed by one or more processors, perform the recited operations. For discussion purposes, the process 500 is described with reference to the system 100 shown in FIG. 1 and the client 102 shown in FIG. 2.

At block 502, compiled code is accessed by a management instrumentation application 210. At block 504, management tags decoder 214 in the management instrumentation 210 determines whether management tags 112 are present within the compiled code. If no management tags 112 are found (i.e. "no" branch from 504), the management instrumentation 210 monitors another compiled code. Once a compiled code with management tags 112 is found, (i.e., following the "yes" branch from 504), the decoder 214 invokes the application corresponding to that compiled code at block 506. The invoked application is then executed at block 508.

At block 510, the management tags decoder 214 obtains management information from code segments that are tagged in the application as a result of the execution. The information is stored in the management instrumentation 210 in a format that is readily accessible to the management system 108. At block 512, the system 108. At block 512, the information is published (i.e., made available) to the management system 108.

Thus, management tags 112 embedded in an application 110 can be used in combination with a management tags decoder 214 present in a management instrumentation 210 to auto-generate provider functionality and expose the management surface of the application 110 to the management system 108.

Exemplary Computer Environment

Figure 6:
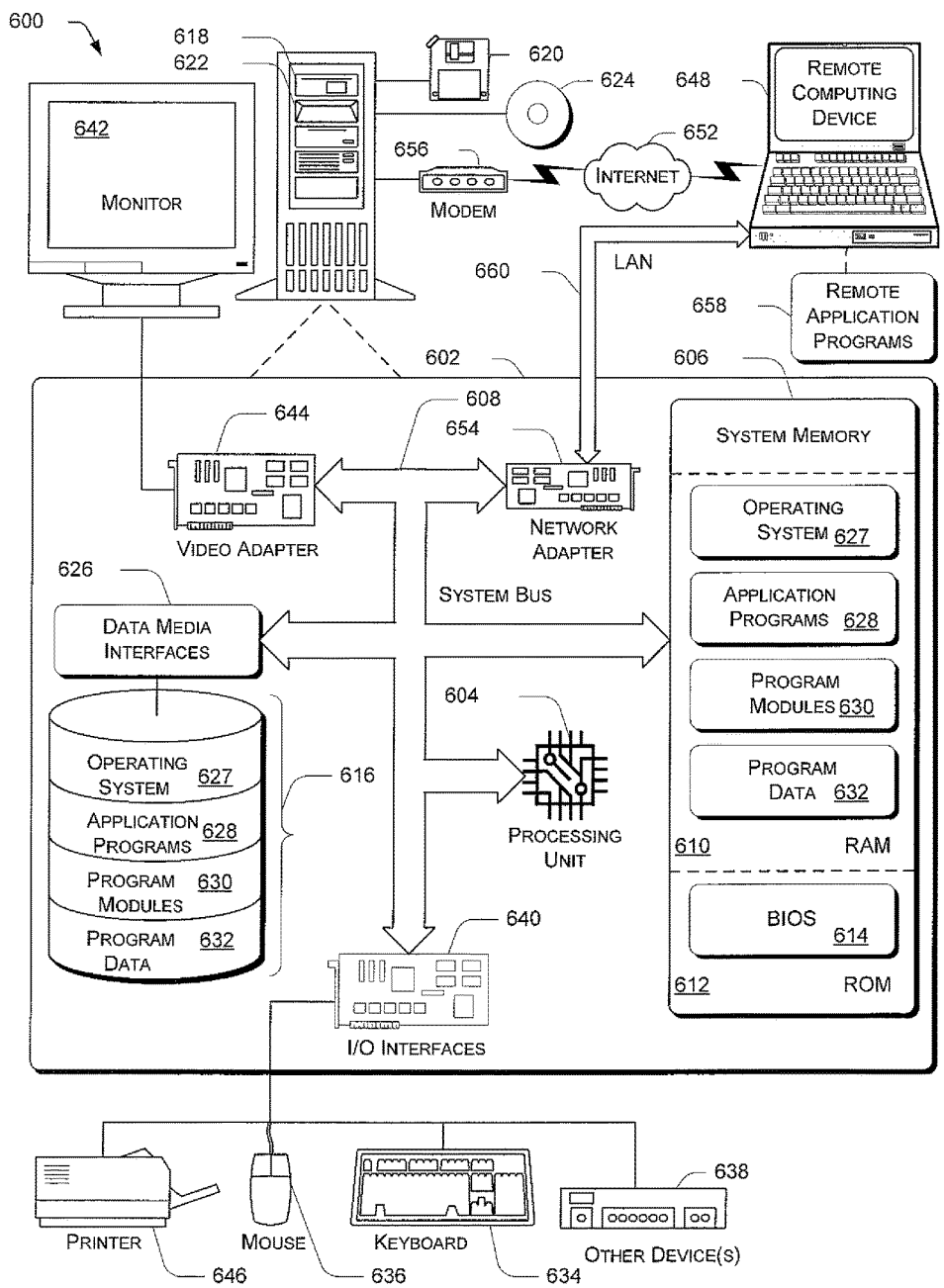
FIG. 6 is an exemplary computer environment.

FIG. 6 illustrates an exemplary general computer environment 600, which can be used to implement the techniques described herein, and which may be representative, in whole or in part, of elements described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing-based device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternately, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 627, one or more application programs 628, other program modules 630, and program data 632. Each of such operating system 627, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the via the input/output interfaces 640.

Computer 602 can operate in a networked environment using logical connections to one or more remote computers, such as a remote computing-based device 648. By way of example, the remote computing-based device 648 can be a personal computer, portable computer, a server, a router, a network computer, a peer device or other common network node, and the like. The remote computing-based device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing-based device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

The above-described methods and system describe autogeneration of provider functionality. Although the invention has been described in language specific to structural features and/or methodological acts, it is to be understood that the invention defined in the appended claims is not necessarily limited to the specific features or acts described. Rather, the specific features and acts are disclosed as disclosed as exemplary forms of implementing the claimed invention.

What is claimed is:

1. A client computing device comprising:
a memory including an application, the application including a plurality of management tags embedded in the application in a non-executable manner such that the plurality of management tags remain in object code after the application is compiled, individual management tags of the plurality of management tags indicating respective code segments of the application that are executable to provide system management information indicating functioning of the application, the individual management tags being selected from a set of pre-defined attributes, wherein individual pre-defined attributes of the set of pre-defined tributes are pre-defined by an attribution system to expose a type of system management information to a management system, and the plurality of management tags including:
a first type of management tag associated with a first plurality of code segments that provide a first type of system management information, the first type of management tag being selected from the set of pre-defined attributes to expose the first type of system management information to the management system; and
a second type of management tag associated with a second plurality of code segments that provide a second type of system management information, the second type of management tag being selected from the set of pre-defined attributes to expose the second type of system management information to the management system;
one or more processors operatively coupled to the memory; and
a management instrumentation in the memory, the management instrumentation to:
identify segments of compiled executable code of the application based on the first type of management tag and the second type of management tag; and
execute the application to obtain the first type of system management information and the second type of system management information based on the segments of compiled executable code of the application.

2. The client computing device of claim 1, wherein the management instrumentation maintains system management information in a database based on a system management information type.

3. The client computing device of claim 1, wherein the management instrumentation publishes system management information to the management system.

4. The client computing device of claim 1, wherein the management instrumentation includes a management tags decoder configured to identify management tags in the application.

5. The client computing device of claim 4, wherein the management tags decoder is employed to expose management surfaces of the application.

6. The client computing device of claim 1, wherein the management instrumentation provides an interface to a plurality of additional applications in the memory and the management system located at a remote server.

7. The client computing device of claim 6, wherein the management instrumentation receives instructions related to diagnostic measures from the management system.

8. The client computing device of claim 7, wherein the management instrumentation includes a management tag decoder to transfer the instructions to at least one application in the memory.

9. A method comprising:
inserting management indicator tags in a class by a client computing device configured to embed management indicator tags in applications of the client computing device in a non-executable manner such that the management indicator tags remain in object code after the applications are compiled, wherein the management indicator tags indicate that a code segment is executable to provide system management information, wherein the management indicator tags are selected from a set of pre-defined attributes, wherein individual pre-defined attributes of the set of pre-defined attributes are pre-defined to provide a type of system management information to a management system, wherein the class is included in code of an application of the client computing device, and wherein the system management information indicates functioning of the application;

determining that compiled executable code of the application is associated with one or more management indicator tags; and in response to determining that the compiled executable code of the application is associated with the one or more management indicator tags, executing the application to obtain the system management information of the application based on the one or more management indicator tags.

10. The method of claim 9, wherein the set of pre-defined attributes include a management entity tag, a management bind tag, and a management create tag.

11. The method of claim 10, wherein the management bind tag marks methods that can be called by the management system and the management create tag marks methods that can be called when a new object is created in a management space.

12. The method of claim 9, further comprising:
identifying at least one value in the code of the application, wherein the at least one value is to be monitored by the management system;
determining that the at least one value is a single value; and
attaching a probe tag at the client computing device to the at least one value.

13. The method of claim 9, further comprising:
identifying at least one value in the code of the application, wherein the at least one value is to be monitored by the management system;
determining that the at least one value is a collection of values; and
attaching an enumerator tag to the at least one value.

14. The method of claim 9, further comprising:
inserting management task tags on user-facing task methods of the application, the management task tags indicating that an end-user can be provided with techniques to perform user-facing tasks; and
compiling the application at the client computing device after inserting the management task tags.

15. A method comprising:
accessing compiled code of an application of a plurality of applications at a client computing device executing a management instrumentation application;
determining, by the client computing device, whether executable code of the compiled code is associated with at least one management tag of the compiled code, wherein the at least one management tag is embedded in the application in a non-executable manner such that the at least one management tag remains in object code after the application is compiled, wherein the at least one management tag indicates respective code segments of the application that are executable to provide system management information that indicates functioning of the application, and wherein the at least one management tag is selected from a set of pre-defined attributes, wherein individual pre-defined attributes of the set of pre-defined attributes are pre-defined to expose a type of system management information;
executing the application at the client computing device via the management instrumentation application;
obtaining, at the client computing device, the system management information that indicates functioning of the application; and
publishing the system management information such that it is available to a remote management system.

16. The method of claim 15, further comprising generating provider functionality through the at least one management tag.

17. The method of claim 15, further comprising exposing a management surface of the application through the at least one management tag.

18. The method of claim 9, wherein the management indicator tags are further based on an attribution system.

19. The method of claim 9, wherein the management indicator tags include:
a first type of management indicator tag associated with a first plurality of code segments that provide a first type of system management information, the first type of management indicator tag being selected from the set of pre-defined attributes to provide the first type of system management information to the management system; and
a second type of management indicator tag associated with a second plurality of code segments that provide a second type of system management information, the second type of management indicator tag being selected from the set of pre-defined attributes to provide the second type of system management information to the management system.

20. The method of claim 15, wherein the at least one management tag includes:
a first type of management tag associated with a first plurality of code segments that expose a first type of system management information to a management system, the first type of management tag being selected from the set of pre-defined attributes; and
a second type of management tag associated with a second plurality of code segments that indicate that an end-user can be provided with techniques to perform user-facing tasks, the second type of management tag being selected from the set of pre-defined attributes.

* * * * *